(12) United States Patent
Barth

(10) Patent No.: US 9,175,807 B2
(45) Date of Patent: Nov. 3, 2015

(54) DEVICE AND METHOD FOR FILLING A CONTAINER WITH A GAS UNDER PRESSURE

(71) Applicant: Air Liquide, Societe Anonyme pour Etude et Exploitation des Procedes Georges Claude, Paris (FR)

(72) Inventor: Frederic Barth, Paris (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 391 days.

(21) Appl. No.: 13/855,905

(22) Filed: Apr. 3, 2013

(65) Prior Publication Data

US 2013/0263969 A1 Oct. 10, 2013

(30) Foreign Application Priority Data

Apr. 6, 2012 (FR) ...................................... 12 53199

(51) Int. Cl.
*F17C 5/06* (2006.01)

(52) U.S. Cl.
CPC ........... *F17C 5/06* (2013.01); *F17C 2203/0604* (2013.01); *F17C 2203/0663* (2013.01);
(Continued)

(58) Field of Classification Search
CPC ................. F17C 5/06; F17C 2250/043; F17C 2250/0439; F17C 2250/0404; F17C 2227/0337; F17C 2227/0341
USPC ....................... 141/4, 82, 83, 94–95, 197–198
See application file for complete search history.

(56) References Cited

U.S. PATENT DOCUMENTS 5,810,058 A    9/1998    Kountz et al.
7,406,987 B2 *   8/2008    Takano et al. ................... 141/82
(Continued)

FOREIGN PATENT DOCUMENTS

WO    WO 2011 049 466      4/2011

OTHER PUBLICATIONS

French Search Report and Written Opinion for FR 1 253 199, mailed Jan. 9, 2013.

*Primary Examiner* — Timothy L Maust
*Assistant Examiner* — Timothy P Kelly
(74) *Attorney, Agent, or Firm* — Christopher J. Cronin

(57) ABSTRACT

The invention relates to a method and device for filling a tank with pressurized gas, comprising transfer of a predefined amount of a gas into the tank from at least one pressurized gas source via a filling duct, the gas being selectively cooled by a cooling component before it enters into the tank in order to prevent a defined temperature limit from being reached in the tank, characterized in that the method comprises a step of defining the maximum amount of energy that can be added to the tank without exceeding the temperature limit, this maximum amount of energy being expressed in the form of the maximum enthalpy that can be added to the tank, a step of defining the effective amount of energy that will be added to the tank during the transfer of gas into the tank without cooling, expressed in the form of an added enthalpy, cooling of the gas by the cooling component being controlled in order to remove selectively an amount of heat from the gas transferred into the tank corresponding at least to the fraction of the added enthalpy that exceeds the maximum enthalpy.

10 Claims, 1 Drawing Sheet

(52) U.S. Cl.
CPC ... *F17C2221/012* (2013.01); *F17C 2223/0123* (2013.01); *F17C 2223/036* (2013.01); *F17C 2225/0123* (2013.01); *F17C 2225/036* (2013.01); *F17C 2227/0157* (2013.01); *F17C 2227/039* (2013.01); *F17C 2227/0341* (2013.01); *F17C 2227/04* (2013.01); *F17C 2250/032* (2013.01); *F17C 2250/034* (2013.01); *F17C 2250/043* (2013.01); *F17C 2250/0439* (2013.01); *F17C 2250/0491* (2013.01); *F17C 2250/0495* (2013.01); *F17C 2250/0631* (2013.01); *F17C 2250/0636* (2013.01); *F17C 2250/0694* (2013.01); *F17C 2250/072* (2013.01); *F17C 2260/021* (2013.01); *F17C 2260/023* (2013.01); *F17C 2260/025* (2013.01); *F17C 2260/026* (2013.01); *F17C 2260/032* (2013.01); *F17C 2265/065* (2013.01); *Y02E 60/321* (2013.01)

(56) References Cited

U.S. PATENT DOCUMENTS

| | | | |
|---|---|---|---|
| 7,647,194 B1 | 1/2010 | Casey et al. | |
| 9,016,329 B2 * | 4/2015 | Mori | 141/2 |
| 2009/0255274 A1 | 10/2009 | Ungar et al. | |
| 2011/0022337 A1 | 1/2011 | Macron et al. | |
| 2011/0259469 A1 | 10/2011 | Harty et al. | |
| 2015/0013830 A1 * | 1/2015 | Ammouri et al. | 141/4 |

\* cited by examiner

DEVICE AND METHOD FOR FILLING A CONTAINER WITH A GAS UNDER PRESSURE

CROSS-REFERENCE TO RELATED APPLICATIONS

This application claims the benefit of priority under 35 U.S.C. §119(a) and (b) to French Patent Application No. 1253199, filed Apr. 6, 2012, the entire contents of which are incorporated herein by reference.

BACKGROUND

1. Field of the Invention

The present invention relates to a filling method and device.

The invention more particularly relates to a method for filling a tank with pressurized gas, comprising transfer of a predefined amount of a gas into the tank from at least one pressurized gas source via a filling duct, the gas being selectively cooled by a cooling component before it enters into the tank in order to prevent a defined temperature limit from being reached in the tank.

2. Related Art

Rapidly filling a tank with pressurized hydrogen gas produces an accumulation of heat in the tank (mainly due to compression of the gas during filling). This accumulation of heat leads to heating of the tank, which may cause the tank to reach or exceed its temperature limit (Tc), above which limit (85° C., for example, for a composite tank) the tank loses its ability to withstand pressure. In order to prevent this, it is known to pre-cool the gas before it enters into the tank. The higher the initial temperature of the gas added, the greater this pre-cooling must be.

One problem with this solution is that it is relatively difficult:

- to evaluate with precision the cooling required;
- to apply the required cooling continuously; and
- to check whether the required cooling has been correctly carried out.

One known solution consists in defining a temperature at which the gas must be cooled before it enters the tank throughout the filling process.

For example the standard SAE TIR J2601 specifies that, for rapid filling operations (no more than five minutes in length) and for final pressures of 35 MPa to 70 MPa, the hydrogen gas must be pre-cooled to a temperature between −40° C. and −33° C., throughout the filling operation.

These pre-cooling temperatures were selected using temperature prediction models, in order to stop the temperature of the gas in the tank exceeding 85° C. at the end of the filling operation.

However, this solution has the following drawbacks:

- the amount of cooling required is generally overestimated in order to accommodate every type of tank liable to need filling, this overestimation is further increased when the temperature limit is applied to the gas in the tank and not to the walls of the tank itself;
- the refrigeration that must be applied to the gas in order to achieve a constant pre-cooling temperature throughout the filling process varies significantly, hence the required refrigerating power is inefficiently used;
- reliably maintaining the hydrogen temperature between −40° C. and −33° C. throughout the filling operation is relatively complex and costly because these temperatures are near the lowest that can be produced industrially on a large scale;
- there is a risk that elastomer seals in the filling installation will deteriorate at these low temperature levels, moreover other components must not be exposed to temperatures below −40° C.; and
- such low temperatures cause frost to form on the equipment, which may impair proper operation of the installation.

SUMMARY OF THE INVENTION

One aim of the present invention is to overcome all or some of the aforementioned drawbacks of the prior art.

For this purpose, the method according to the invention, moreover conforming to the generic description given thereof in the above preamble, is essentially characterized in that the method comprises a step of defining the maximum amount of energy that can be added to the tank without exceeding the temperature limit, this maximum amount of energy being expressed in the form of the maximum enthalpy added to the tank, a step of defining the effective amount of energy that will be added to the tank during the transfer of gas into the tank without cooling, expressed in the form of an added enthalpy, cooling of the gas by the cooling component being controlled in order to remove selectively an amount of heat from the gas transferred into the tank corresponding at least to the fraction of the added enthalpy that exceeds the maximum enthalpy.

Moreover, embodiments of the invention may comprise one or more of the following features:

- the maximum amount of energy, expressed in the form of the maximum enthalpy, corresponds to the maximum amount of energy that can be added to the tank before the tank itself exceeds the temperature limit;
- the maximum amount of energy, expressed in the form of the maximum enthalpy, corresponds to the maximum amount of energy that can be added to the tank before the gas contained in the tank exceeds the temperature limit;
- the maximum amount of energy, expressed in the form of the maximum enthalpy, is calculated before or measured experimentally before the filling operation, for the type of tank in question, as a function of at least one of the following parameters: the initial temperature of the gas in the tank, the ambient temperature around the tank, the initial temperature of the tank, structural properties, structural, thermal and geometrical properties of the tank, the filling rate of the tank, and/or the initial pressure in the tank; the maximum enthalpy being calculated via a state function known for the gas as a function of the pressure and temperature of the gas, the value of this maximum enthalpy being defined as a function of the corresponding maximum experimentally measured temperature reached in the tank;
- the step of defining the effective amount of energy added to the tank expressed in the form of the added enthalpy is calculated as a function of one at least of the following parameters: the ambient temperature around the tank, the filling rate of the tank, the amount of gas added during the filling operation, the pressure in the tank, the calculated or measured temperature in the tank, the mass flow rate of gas at the inlet of the tank, the added enthalpy being calculated via a state function known for the gas as a function of the pressure and temperature of the gas;
- the value of the maximum enthalpy for the tank is a decreasing function of the initial temperature of the gas in the tank, and the added enthalpy is an increasing function of the initial temperature of the gas of the source, the cooling component then selectively cooling the gas during a filling operation if an initial temperature level, corresponding to initial conditions where the maximum enthalpy and the added enthalpy coincide, is exceeded;

the cooling of the gas by the cooling component is controlled in order to selectively remove an amount of heat from the gas transferred into the tank corresponding only to the fraction of the added enthalpy that exceeds the maximum enthalpy;

the gas source comprises a component for compressing gas transferred, directly supplying the tank via the filling duct; and the gas source comprises a reservoir of gas at a pressure between 200 and 1000 bar, the filling duct comprising a component for controlling the flow rate of the gas transferred to the tank.

The invention also relates to a device for filling a tank with gas, comprising a source of pressurized gas, a filling duct for transferring the gas from the source to the tank, a component for selectively cooling the gas before it enters into the tank in order to prevent a defined temperature limit from being reached in the tank, and an electronic control unit connected to the cooling component, the unit being configured to store data representing the maximum amount of energy that can be added to the tank without exceeding the temperature limit in the tank, this maximum amount of energy being expressed in the form of the maximum enthalpy (Hmax) that can be added to the tank, the unit being configured to determine the effective amount of energy added to the tank during the transfer of gas into the tank without cooling, expressed in the form of an added enthalpy, the unit being configured in order to control the cooling of the gas by the cooling component in order to selectively remove an amount of heat from the gas transferred into the tank corresponding at least to the fraction of the added enthalpy (H0) that exceeds the maximum enthalpy.

The invention may also relate to any alternative device or method comprising any combination of the features above and below.

BRIEF DESCRIPTION OF THE FIGURES

Other particularities and advantages of the invention will become apparent on reading the following description, given with reference to the figures, in which.

DETAILED DESCRIPTION OF THE INVENTION

Figure 1:
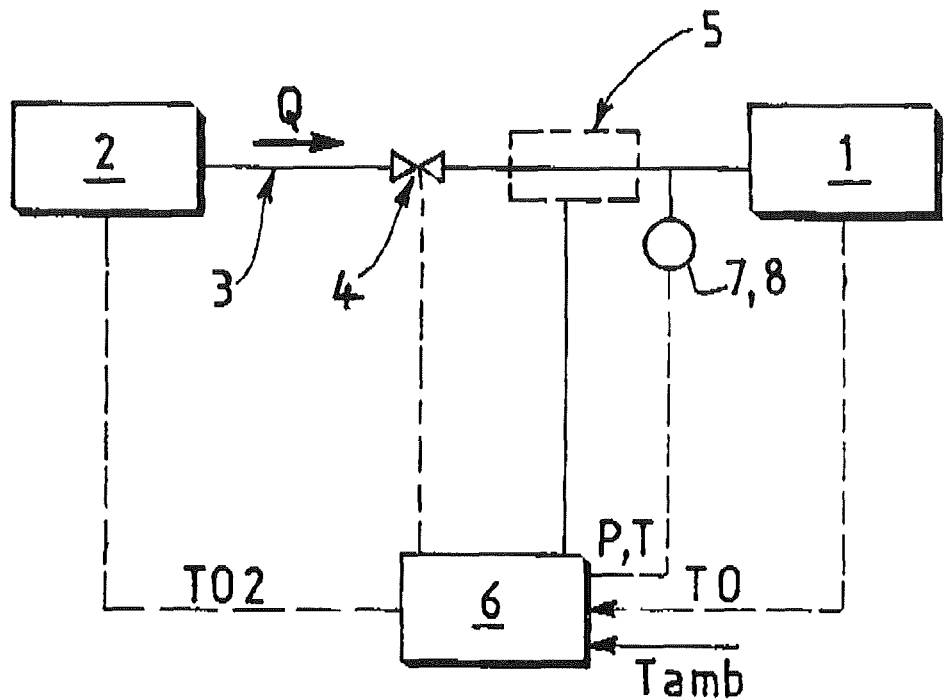
FIG. 1 shows a schematic and partial view illustrating an example of the structure of and a way of operating a filling device according to one possible embodiment of the invention.

The filling device illustrated, by way of a simplified example, in FIG. 1 comprises, as is conventionally the case, a source 2 of pressurized gas, for example a reservoir of hydrogen gas at a pressure of 700 to 1000 bar, and a filling duct 3 for transferring the gas from the source 2 to the tank 1. The duct may comprise a component 4 for regulating the flow of gas transferred from the source to the tank 1, for example a valve 4, preferably a control valve. Alternatively, or in addition, the source may comprise a compressor.

The device comprises a component 5 for selectively cooling the gas before it enters into the tank 1, for example a heat exchanger connected to a cold loop containing a coolant refrigerated by a cold source (for example a store of cryogenic temperature nitrogen). Of course, any other type of cooling component may be employed.

Moreover, the device comprises an electronic control unit 6 connected to the cooling component 5 in order to control the latter. The unit 6 may also be connected to one at least of the following: the regulating component 4 (with a view to control of the latter), a sensor measuring ambient temperature Tamb, a sensor 7 measuring the pressure in the tank 1 (measured for example at the inlet of the tank 1, in the filling duct 3), a sensor measuring the temperature in the tank 1, a sensor measuring the temperature of the gas in the filling duct 3 downstream of the regulating component 4, a component measuring the mass flow rate of gas downstream of the regulating component, a sensor 8 measuring the temperature of the gas in the filling duct 3 and/or in the source 2, and a sensor measuring the pressure of the gas in the source 2.

The electronic unit 6 (which for example comprises at least one microprocessor) controls the filling, and especially the pre-cooling of the gas via the cooling component 5, in order to prevent overheating of the tank 1 during the filling operation and especially until the end of the filling operation.

In particular, the electronic unit 6 controls the pre-cooling in order to prevent the tank 1 from reaching a set temperature limit Tc, for example 85° C. for a composite tank.

For this purpose, the unit 6 is configured to receive, or store in memory, data representing the maximum amount of energy that can be added to the tank 1 before the temperature limit Tc is exceeded in the tank 1. The maximum amount of energy is preferably expressed in the form of a value of the maximum enthalpy Hmax that can be added to the tank 1. For example, in the case of a filling station, a wired or wireless communication system may enable this information regarding the properties of the tank 1 to be transferred to the filling station.

The unit 6 is configured to determine the effective amount of energy that would be added to the tank 1, without cooling, during the transfer of gas into the tank 1, expressed in the form of an added enthalpy H0. On the basis of these two quantities, the unit 6 controls the cooling of the gas by the cooling component 5 in order to selectively remove an amount of heat from the gas transferred into the tank 1, corresponding at least to the fraction of the added enthalpy H0 that exceeds the maximum enthalpy Hmax.

In other words, the filling method according to the invention involves determining the amount of refrigeration required to cool the gas enough to prevent overheating.

The amount of refrigeration required is given by the amount of energy (enthalpy) described above.

The maximum enthalpy Hmax depends on the structural and geometrical properties of the tank 1 and possibly on the filling conditions (such as the filling rate for example). The added enthalpy H0 reflects the amount of energy added to the tank during filling (without pre-cooling).

Specifically, there is a maximum amount of heat (joules), which is to say enthalpy, that can be added to a tank 1 before the temperature limit Tc is exceeded. For a given type of tank 1, this maximum enthalpy Hmax depends on the initial temperature (ambient temperature or temperature measured in the tank).

This maximum enthalpy Hmax may be defined beforehand for the type of tank 1 using models validated by experimental measurements. For example, the physical laws governing heat exchange between a hot gas in a tank and the wall of the tank may be used (in the case of a composite tank equipped with a filament winding, the wall typically comprises two layers: an internal envelope called a liner and the external composite structure).

This maximum enthalpy Hmax is preferably defined in order to prevent the tank (itself) from reaching the temperature limit Tc; however, of course, this limit Hmax may be defined in order to prevent the gas in the tank (instead of the tank itself) from reaching the temperature limit Tc. In the second case however, the amount of cooling required will be increased relative to the first case.

The enthalpy H0 added during the filling operation for a given type of tank is itself a function of the initial temperature and pressure conditions of the gas in the source 2 and of the method used to transfer the gas (pressure difference or by means of a compressor).

Therefore, for a tank of a given type, pre-cooling is required above a certain initial temperature level in the tank 1 and in the source 2, above which the added enthalpy H0 exceeds the maximum enthalpy Hmax. Of course, the initial temperatures of the gases in the tank 1 and in the source 2 may be different.

Figure 2:
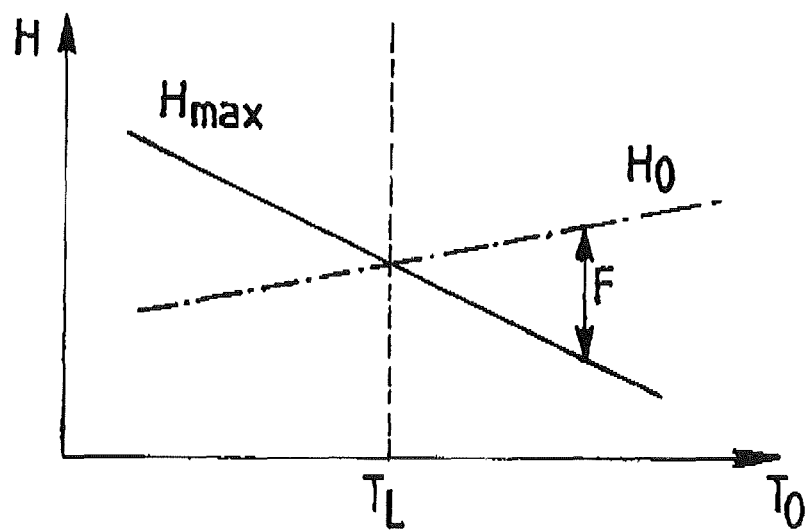
FIG. 2 schematically illustrates curves of maximum enthalpy and added enthalpy during the filling of a tank as a function of the initial temperature conditions, illustrating the operating principle of the invention.

This is schematically illustrated in FIG. 2. In the simplified example of FIG. 2, it is assumed that the initial temperatures in the tank 1 and in the source 2 are identical. The maximum enthalpy Hmax decreases, for example linearly, as the initial temperature T0 of the gas in the tank 1 increases. Likewise, the added enthalpy H0 is an increasing function, for example a linearly increasing function, as the same initial temperature T0 of the gas increases.

Thus, there is no risk of exceeding the temperature limit Tc while the added enthalpy H0 is smaller than the maximum enthalpy Hmax. This occurs below an initial temperature TL, above which cooling F corresponding to the difference between these enthalpies H0−Hmax must be carried out (see FIG. 2).

The value of the enthalpy H0 that would be added without cooling may be easily determined a priori. In the case of a transfer by pressure difference through a control valve 4, this added enthalpy H0 corresponds to the enthalpy of the amount of gas to be added under the temperature and pressure conditions of the source 2.

The value of the enthalpy effectively added with cooling may be determined in real time by calculating the enthalpy via the measured parameters of pressure P and temperature T and of mass flow rate at the inlet of the tank 1. This is because enthalpy is a known gas state function that depends on pressure P and temperature T.

This allows the cooling to be controlled with precision, and it to be checked afterwards whether the required refrigeration was indeed correctly transferred to the gas.

This filling method thus reduces the quantitative requirements in terms of pre-cooling of the gas. Specifically, the maximum enthalpy Hmax may be calculated in order to reflect the temperature limit of the tank (instead of the gas in the tank). This reduces the need for cooling due to the difference observed between the temperature of the tank and the temperature of the gas in the tank, the latter generally being higher.

In addition, this method makes it possible to tailor the amount of cooling provided to that needed depending on the properties of the tank 1 to be filled and its initial conditions (pressure, temperature).

This makes savings in terms of energy and cost of the installation possible.

This technique also allows further improvements to be envisaged, for example a controlled increase in temperature at the end of the filling operation could be used to heat the filling nozzle for the comfort of the user and in order to reduce the risk of frost.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for filling a tank with pressurized gas, comprising transfer of a predefined amount of a gas into the tank from at least one pressurized gas source via a filling duct, the gas being selectively cooled by a cooling component before it enters into the tank in order to prevent a defined temperature limit from being reached in the tank, the method comprising defining the maximum amount of energy that can be added to the tank without exceeding the temperature limit, this maximum amount of energy being expressed in the form of the maximum enthalpy that can be added to the tank, defining the effective amount of energy that will be added to the tank during the transfer of gas into the tank without cooling, expressed in the form of an added enthalpy, cooling the gas by the cooling component being controlled in order to remove selectively an amount of heat from the gas transferred into the tank corresponding at least to the fraction of the added enthalpy that exceeds the maximum enthalpy.

2. The method of claim 1, wherein the maximum amount of energy, expressed in the form of the maximum enthalpy, corresponds to the maximum amount of energy that can be added to the tank before the tank itself exceeds the temperature limit.

3. The method of claim 1, wherein the maximum amount of energy, expressed in the form of the maximum enthalpy, corresponds to the maximum amount of energy that can be added to the tank before the gas contained in the tank exceeds the temperature limit.

4. The method of claim 1, wherein the maximum amount of energy, expressed in the form of the maximum enthalpy, is calculated before or measured experimentally before the filling operation, for the type of tank in question, as a function of at least one of the following parameters: the initial temperature of the gas in the tank, the ambient temperature around the tank, the initial temperature of the tank, structural properties, structural, thermal and geometrical properties of the tank, the filling rate of the tank, and/or the initial pressure in the tank; the maximum enthalpy being calculated via a state function known for the gas as a function of the pressure and temperature of the gas, the value of this maximum enthalpy being defined as a function of the corresponding maximum experimentally measured temperature reached in the tank.

5. The method of claim 1, wherein the step of defining the effective amount of energy added to the tank expressed in the form of the added enthalpy is calculated as a function of one at least of the following parameters: the ambient temperature around the tank, the filling rate of the tank, the amount of gas added during the filling operation, the pressure in the tank, the calculated or measured temperature in the tank, the mass flow rate of gas at the inlet of the tank, the added enthalpy being calculated via a state function known for the gas as a function of the pressure and temperature of the gas.

6. The method of claim 1, wherein the value of the maximum enthalpy for the tank is a decreasing function of the initial temperature of the gas in the tank, and the added enthalpy is an increasing function of the initial temperature of the gas of the source, the cooling component then selectively cooling the gas during a filling operation if an initial temperature level, corresponding to initial conditions where the maximum enthalpy and the added enthalpy coincide, is exceeded.

7. The method of claim 1, wherein the cooling of the gas by the cooling component is controlled in order to selectively remove an amount of heat from the gas transferred into the tank corresponding only to the fraction of the added enthalpy that exceeds the maximum enthalpy.

8. The method of claim 1, wherein the gas source comprises a component for compressing gas transferred, directly supplying the tank via the filling duct.

9. The method of claim 1, wherein the gas source comprises a reservoir of gas at a pressure between 200 and 1000 bar, the filling duct comprising a component for controlling the flow rate of the gas transferred to the tank.

10. A device for filling a tank with gas, comprising a source of pressurized gas, a filling duct for transferring the gas from the source to the tank, a component for selectively cooling the gas before it enters into the tank in order to prevent a defined temperature limit from being reached in the tank, and an electronic control unit connected to the cooling component, characterized in that the unit is configured to store data representing the maximum amount of energy that can be added to the tank without exceeding the temperature limit in the tank, this maximum amount of energy being expressed in the form of the maximum enthalpy that can be added to the tank, the unit being configured to determine the effective amount of energy added to the tank during the transfer of gas into the tank without cooling, expressed in the form of an added enthalpy, the unit being configured in order to control the cooling of the gas by the cooling component in order to selectively remove an amount of heat from the gas transferred into the tank corresponding at least to the fraction of the added enthalpy that exceeds the maximum enthalpy.

* * * * *